United States Patent

[11] 3,634,835

[72] Inventor John B. Houston
South Pasadena, Calif.
[21] Appl. No. 1,734
[22] Filed Jan. 9, 1970
[45] Patented Jan. 11, 1972
[73] Assignee Burroughs Corporation
Detroit, Mich.

[54] STORAGE SYSTEM HAVING A HEAD ASSEMBLY FOR READING AND WRITING ON A RECORD MEMBER HAVING A TOUCH INDICATOR CIRCUIT
18 Claims, 1 Drawing Fig.

[52] U.S. Cl. .......... 340/174.1 B
[51] Int. Cl. .......... G11b 5/48, G11b 21/16
[50] Field of Search .......... 340/174.1 B; 346/74 MD

[56] References Cited
UNITED STATES PATENTS

| | | | |
|---|---|---|---|
| 3,401,383 | 10/1968 | Ault .......... | 340/174.1 B |
| 3,531,789 | 9/1970 | Halfhill et al. .......... | 340/174.1 B |
| 3,290,666 | 12/1966 | Crew .......... | 340/174.1 B |
| 3,329,943 | 7/1967 | Tanguy, Jr. et al. .......... | 340/174.1 B |

*Primary Examiner*—Stanley M. Urynowicz, Jr.
*Assistant Examiner*—Vincent P. Canney
*Attorney*—Christie, Parker & Hale

ABSTRACT: A touch indicator circuit generates and stores a warning signal in response to an offending contact between a head apparatus and a moving record member having a magnetic surface. A differential input comparator senses a change in potential, with respect to a reference potential, which occurs in response to head/record member contacts.

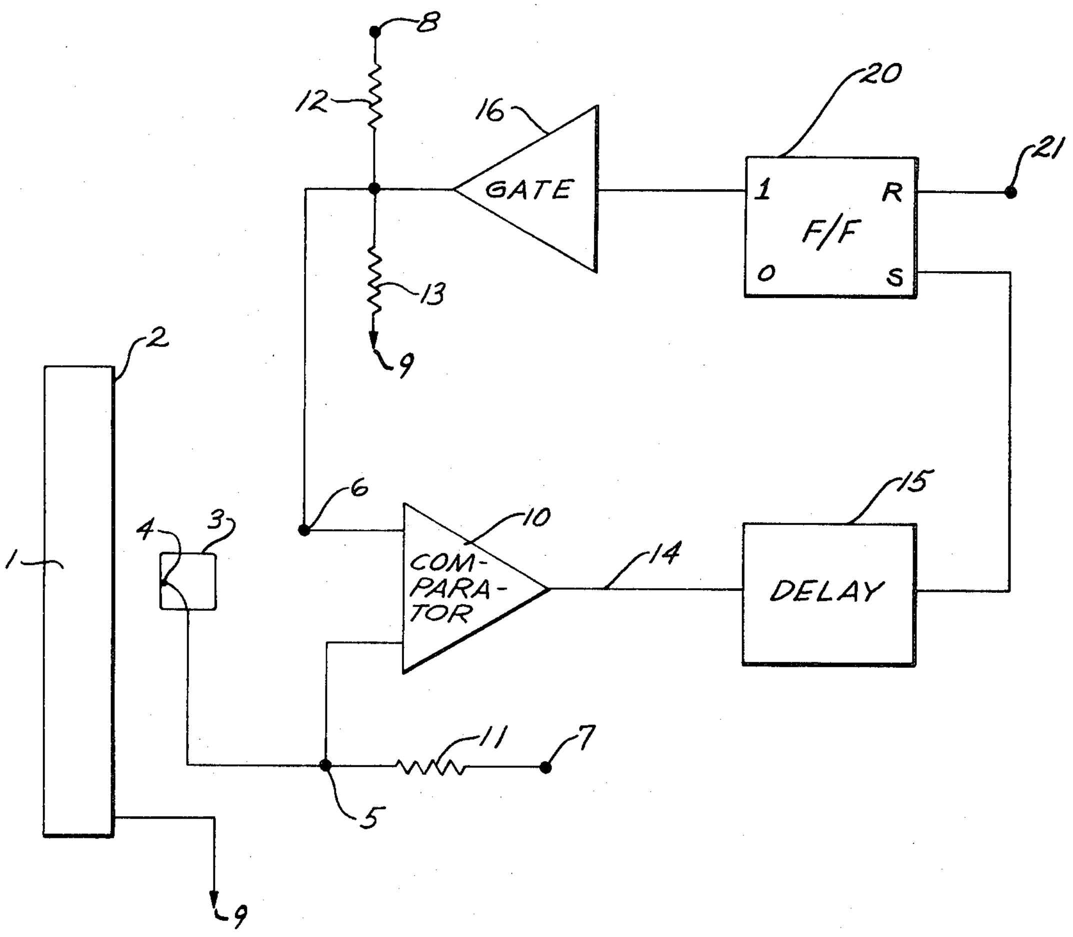
INVENTOR.
JOHN B. HOUSTON
BY
Christie, Parker & Hale
ATTORNEYS

STORAGE SYSTEM HAVING A HEAD ASSEMBLY FOR READING AND WRITING ON A RECORD MEMBER HAVING A TOUCH INDICATOR CIRCUIT

BACKGROUND OF THE INVENTION

1. Field of the Invention

This invention relates to storage systems having moving magnetic recording members and, more particularly, to such a storage system having an alarm system for indicating when a head assembly for reading and writing on the record member makes contact with the record member.

2. Description of the Prior Art

Drums, and disks, etc. having magnetic surfaces are frequently used for the storage of signals. Electromagnetic transducers, commonly called heads, are commonly floated on a thin film of air adjacent the moving recording surface and are used for writing on and reading from the magnetic surface as it moves relative to the head. State of the arc machines frequently float the heads very close to the moving recording surface. Stating it differently, the head to recording surface spacing provides an extremely small dielectric gap. This is done in order to produce good signal resolution and low noise during writing or reading. The smaller the gap, the more likely that the head will accidentally make contact with the magnetic surface because of instability in the floating heads, vibration of the moving recording surface, or other mechanical imperfections in the recording machine structure. Dust particles also wedge in between the heads and recording surface causing malfunctions. As a result it is necessary to have means for detecting such offending contacts an for generating an alarm to notify operating personnel, to cause the heads to be retracted as quickly as possible before further damage is done, and to stop further reading and writing until the situation is corrected. A prior art system for effecting touch detection is described in Tanguy et al., U.S. Pat. No. 3,329,943, entitled HEAD TO DISK SEPARATION DETECTOR, which issued on July 4, 1969, and is assigned to the same assignee as the present invention. The system described in the reference patent incorporates a magnetic record member, such as a disk, and a magnetic transducer member each having an electrically conductive surface. Various electronic touch indicator circuits are described, each of which can generate an alarm signal in response to offending head/disk contacts. In each such circuit the input stage is a transistor. A voltage source supplies bias current to the input transistor. The base-emitter junction of the input transistor defines a voltage drop which cooperates with other circuit elements in establishing a potential across the disk/head gap. Since the dielectric gap is so small extremely high voltage gradients exist across the gap. For example, a gap potential of 1.5 volts causes a voltage gradient of 15,000 volts per inch at a typical gap of 100 microinches. As the gap narrows this voltage gradient increases geometrically until arcing occurs. As current is drawn between the electrically conductive surfaces the voltage level at the base terminal of the input transistor changes. The transistor amplifies this voltage change and thereby provides an indication that an electrical contact has been established between the two surfaces.

Several problems have arisen in the use of these prior art circuits. First of all, the potential established across the gap created such high voltage gradients that frequently an arc would be established at too large a head to disk spacing. It is desirable to generate a warning signal only if the head actually touches the disk or comes so close to the disk that touching is inevitable. If there is an adequate margin of safety there is no need to generate a warning signal. Furthermore, it is inefficient to have the operating personnel waste time troubleshooting the system when there is nothing wrong with it. In addition, the current established between the two surfaces in the prior art systems was so large that often the surfaces of the disk became damaged. Attempts to modify the design of the transistor input stage did not mitigate these problems. The low-input impedance nature of the base-emitter junction of the input transistor creates the need for relatively high bias currents. This places constraints on the design flexibility of the input stage.

SUMMARY OF THE INVENTION

In contrast to the prior art systems described above, the invention employs a differential input comparator stage for sensing whether electrical contact has been made between a conductive surface of a magnetic record member and a conductive surface on a head assembly. The differential input comparator compares a reference potential with a potential applied between the conductive surfaces of the record member and head and forms an output signal when there is a change in potential between the conductive surfaces indicating a touch.

In contrast to the prior art systems, the required reference potential applied between the record member and head for proper sensing is not affected by a base-emitter junction voltage. The designer is free to select as low a potential for actuation of the alarm system as is desired. Therefore the likelihood of false touch indication is appreciably diminished. In a preferred embodiment an impedance is coupled in series between the source establishing the potential and the conductive surfaces of the head and record member. This impedance limits the amount of current which can flow between the two surfaces. The impedance value can be set so as to limit the current flow to any desired amount. The differential input comparator does not require substantial external biasing current as does the transistor input stage of the prior art circuits. Therefore, there is no need to cause relatively high currents to flow.

In a preferred embodiment of the invention, a delay circuit is provided to delay the output signal from the comparator for a time long enough to distinguish between true offending touches and inoffensive noise signals. In accordance with a further aspect of the present invention a positive feedback loop is provided between the delay circuit and the differential input comparator which causes the comparator to latch up and maintain its output signal in response to offending contacts.

BRIEF DESCRIPTION OF THE DRAWING

The drawing shows a block diagram of a disc file system including a touch indicator circuit and embodying the present invention.

DETAILED DESCRIPTION OF A SPECIFIC EMBODIMENT

The FIGURE a magnetic storage device in the form of a disk 1 is depicted having an electrically conductive surface 2. During operation, disk 1 is rotated by means not shown. A magnetic transducer or head 3 is diagrammatically shown spaced away from the disk face 2. Head 3 has an electrical contact 4 which is connected to terminal 5, which is an input to a differential input comparator circuit 10, and to resistor 11. The contact 4 has a conductive surface on the floating surface of the head adjacent to the disk 2. The other end of resistor 11 is connected to terminal 7 which is connected to a low-impedance voltage source (not shown). Input terminal 6 of comparator 10 is connected to the junction of resistors 12 and 13 and the output of feedback gate 16. The other end of resistor 12 is connected to terminal 8 which is connected to a voltage source (not shown). The other end of resistor 13 is connected to ground terminal 9 (0 volts potential) which is also connected to disk surface 2. Output terminal 14 of comparator 10 is connected to the input of delay circuit 15. The output terminal of delay circuit 15 is connected to the set input of flip-flop 20. The "1" output of the flip-flop 20 is connected to the input of feedback gate 16. The reset input of flip-flop 20 is connected to terminal 21 to receive therefrom a manual reset signal.

In a preferred embodiment, the head/disk spacing is nominally 100 microinches. Low-impedance voltage source 7 is set at 0.6 volts. The values of resistors 12 and 13 and the value of voltage source 8 are selected so that the voltage established at terminal 6 is 0.3 volts during normal operation.

Comparator 10 is a differential input amplifier. For example, it could be $\mu$ A710 comparator circuit manufactured by the Semiconductor Division of Fairchild Camera and Instruments Corp. among others.

Delay circuit 15 could comprise a resistor-capacitor delay circuit and a threshold circuit. There are many threshold circuits known to those skilled in the art. For example, a Schmitt trigger circuit exhibits a characteristic that its output is at one level when its input is below a given threshold and its output is at a different level when its input is above the given threshold.

Flip-flop 20 is a conventional bistable device exhibiting the following characteristics. Its output terminal defines one or two voltage levels, the first of which is called a "1" and the second is called a "0." It possesses two input terminals, the first of which is called a set input and the second of which is called a reset input. If the input signal to the set input corresponds to a "1" level the flip-flop output goes to the "1" level. If the set input signal returns to the "0" level the flip-flop output remains at the "1" level. If the reset signal then assumes a level corresponding to the "1" level then the flip-flop output returns to "0" level.

Feedback gate 16 is a typical logical AND circuit. For example, it could be a CT$\mu$ L953 manufactured by the Semiconductor Division of the Fairchild Camera and Instruments Corp. Its output stage is nonconducting so long as its input signal is at the "0" level. Therefore, the voltage at its output terminal depends only upon the current flowing through the external resistor divider network comprising resistors 12 and 13. Its output stage conducts if its input signal is at the "1" level. In that event the voltage at its output terminal rises as the output current flows into resistor 13.

In normal operation disk 1 rotates relative to head 2, and head 2 floats on a film of air created by the rotating disk. Magnetic flux lines are established across the head/disk gap by means of cores (not shown) in the head assembly 2. A voltage gradient is also established across the gap by virtue of the voltage applied to contact 4 and the ground potential applied to disk surface 2. When head 3 moves so close to disk 1 that electrical conduction is established between their two electrically conductive surfaces current will flow through resistor 11. The voltage level at terminal 5 will drop. When the voltage level drops below the voltage level established at terminal 6 the output of comparator 10 changes from a high level to a low level. If electrical conduction is maintained for a time longer than the time constant of delay circuit 15, the delay circuit 15 will change its output level from a low level to a high level. Flip-flop 20 will respond to the change in level of the output signal of delay 15 thereby changing its output from a "0" to a "1" level. Responding to the change in the output of flip-flop 20 feedback gate 16 causes its output stage to conduct. The voltage level established by the resistor divider network will then respond to the current flowing out of feedback gate 16 and rise to a new high level. This high level is set above the normal level established at terminal 5. Therefore, even if conduction ceases between the two electrically conductive surfaces and the voltage level at terminal 5 returns to its normal level, the output of comparator 10 will remain low. The circuit is thus latched up.

It should be noted that modifications could be made to the above-described specific embodiment without departing from the spirit of the invention. By way of example, a resistor-capacitor network could be coupled in series circuit relation between the electrical contact and the differential input comparator circuit to provide means for delaying the response of the comparator to electrical contacts so as to discriminate between offending touches and spurious signals.

What is claimed is:

1. A storage system comprising:
- a magnetic record member having an electrically conductive surface;
- a magnetic transducer assembly for reading and writing on said record member and having an electrically conductive surface, said surfaces being normally separated by a dielectric gap;
- a source of electrical energy for establishing between said surfaces a potential difference continuously greater than a predetermined value while there is a normal gap therebetween; and
- a differential input comparator responsive to the existence across the gap of a potential difference having a value less than the predetermined value for generating a signal which indicates that electrical contact has occurred between said surfaces.

2. A storage system according to claim 1 comprising an impedance connected in series between the potential source and at least one of said surfaces for limiting the current flow in the event of a contact between said surfaces.

3. A storage system according to claim 1 wherein said comparator has a first input coupled to one of said conductive surfaces and a second input coupled to a reference potential corresponding to the potential at which electrical contact is to be indicated.

4. The storage system according to claim 1 in which the magnetic record member is a rotatable magnetic disk.

5. A storage system according to claim comprising:
- bistable means for storing a signal indicating a touch in response to said signal from said comparator.

6. A storage system according to claim 5 comprising a delay circuit coupling the comparator to the bistable means to prevent the bistable means from storing signals caused by a spurious signal.

7. A storage system according to claim 6, comprising:
- means for coupling the output of the bistable means to an input of the comparator for maintaining said output signal from said comparator after said bistable means stores such signal.

8. The storage system according to claim 5 comprising circuit means coupled in series circuit relation between an input to the differential comparator and one of said electrical surfaces to delay the indication by the comparator thereby preventing the bistable means from storing signals caused by a spurious signal.

9. A storage system comprising:
- a rotatable magnetic disk having an electrically conductive surface;
- an assembly constructed for floating on a film of air adjacent to the moving disk and having an electrically conductive surface and supporting a magnetic transducer in proximity with the disk;
- a substantially constant voltage source and resistor electrically coupled in series circuit relation with said conductive surfaces;
- a differential input comparator circuit having an input electrically coupled to one of the electrically conductive surfaces for generating a first signal which indicates that electrical conduction has occurred between said surfaces;
- a delay circuit responsive to said first signal for generating a second signal after the first signal has been present for a prescribed length of time; and
- bistable circuit means responsive to the second signal for generating and storing a third signal indicating a touch between said surfaces.

10. A storage system comprising:
- a record member having a magnetic recording surface;
- a magnetic head assembly for reading and writing on said recording surface during relative movement therebetween, said record member and head having a conductive surface on each which make electrical contact in the event of contact between record member and head assembly;
- a source of voltage;

a circuit for coupling the source of voltage across said conductive surfaces and including an impedance connected in series circuit relation with the conductive surfaces and any source of potential for limiting the flow of current between said conductive surfaces in the event of a contact therebetween; and a differential input comparator circuit having a first input coupled to one of said conductive surfaces and a second input coupled to a reference potential, the comparator circuit being responsive to the existence of a predetermined potential at said first input with respect to said reference potential for providing a predetermined output signal which indicates contact between said conductive surfaces.

11. A storage system according to claim 10 wherein the source of voltage supplies a substantially constant voltage and wherein said impedance comprises a resistor.

12. A storage system according to claim 10, comprising a feedback circuit coupled between the output of said differential input comparator circuit and one of said inputs to said differential comparator for maintaining said predetermined output signal even after the termination of contact between said conductive surfaces.

13. A storage system according to claim 12, wherein the feedback circuit comprises a delay circuit which delays application of the feedback signal long enough to insure it is not caused by a spurious signal.

14. A storage system according to claim 12 wherein said feedback circuit comprises a bistable circuit having an input coupled to the output of said delay circuit and an output coupled to one of the inputs of said differential comparator circuit.

15. A storage system according to claim 14, wherein the outputs of said bistable circuit is coupled to the second input of said differential input comparator circuit.

16. A storage system according to claim 14 comprising a voltage divider coupled to the second input of said differential input comparator circuit for applying a reference potential thereto.

17. A storage system comprising:

a magnetic record member having an electrically conductive surface;

a magnetic transducer assembly for reading and writing on said record member and having an electrically conductive surface, said surfaces being normally separated by a dielectric gap;

a source of electrical energy for establishing a potential difference greater than a predetermined value between said surfaces while there is a normal gap between said surfaces and comprising means for causing said potential difference to change to a lower value when the gap is abnormally small;

a differential input comparator;

a source of a substantially constant reference potential for indicating a normal gap; and means for simultaneously coupling the instantaneous signals being formed by said reference potential and one of said surfaces to different inputs of said comparator thereby causing the comparator to generate a first signal for a normal gap and a second signal indicating an abnormally small gap when the potential difference between said surfaces changes to said lower value due to an abnormally small gap.

18. A storage system according to claim 17, wherein said means for causing said potential difference to change comprises means for coupling the source of electrical energy across said surfaces and an impedance coupled in between said one surface and said source of electrical energy.

* * * * *